(12) United States Patent
Choi et al.

(10) Patent No.: US 11,244,118 B2
(45) Date of Patent: Feb. 8, 2022

(54) DIALOGUE MANAGEMENT METHOD BASED ON DIALOGUE MANAGEMENT FRAMEWORK AND APPARATUS THEREOF

(71) Applicant: Samsung Electronics Co., Ltd., Suwon-si (KR)

(72) Inventors: Junhwi Choi, Seongnam-si (KR); Sanghyun Yoo, Seoul (KR); Sangsoo Lee, Seoul (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 16/774,166

(22) Filed: Jan. 28, 2020

(65) Prior Publication Data

US 2021/0034821 A1    Feb. 4, 2021

(30) Foreign Application Priority Data

Aug. 1, 2019 (KR) .................. 10-2019-0094048

(51) Int. Cl.
*G06F 40/30* (2020.01)
*G06F 3/0482* (2013.01)
*G06F 3/0484* (2013.01)

(52) U.S. Cl.
CPC .......... *G06F 40/30* (2020.01); *G06F 3/0482* (2013.01); *G06F 3/0484* (2013.01)

(58) Field of Classification Search
CPC ....... G06F 40/30; G06F 3/0482; G06F 3/0484
See application file for complete search history.

(56) References Cited

U.S. PATENT DOCUMENTS

| 2013/0275875 | A1  | 10/2013 | Gruber et al. |
| 2014/0040748 | A1* | 2/2014  | Lemay ................ G10L 15/1822 715/728 |
| 2014/0343950 | A1* | 11/2014 | Simpson ................ G10L 15/22 704/275 |
| 2014/0365209 | A1  | 12/2014 | Evermann |
| 2017/0084082 | A1* | 3/2017  | McTaggart ............. H04L 67/18 |
| 2017/0109011 | A1  | 4/2017  | Jiang |
| 2017/0185263 | A1  | 6/2017  | Xie |

(Continued)

FOREIGN PATENT DOCUMENTS

| JP | 6346281 B2         | 6/2018  |
| KR | 10-2013-0136167 A  | 12/2013 |

(Continued)

OTHER PUBLICATIONS

Extended European Search Report dated Nov. 6, 2020 in counterpart European Patent Application No. 20172416.8 (8 pages in English).

*Primary Examiner* — Seth A Silverman
(74) *Attorney, Agent, or Firm* — NSIP Law

(57) ABSTRACT

Disclosed is a dialogue management method and apparatus. The dialogue management method includes sequentially resolving an application domain to provide a service to a user, a function appropriate for an intent of a user from among functions of the application domain, and at least one slot to perform the function, adaptively determining an expression scheme of a dialogue management interface depending on a progress of the sequentially resolving, and displaying the dialogue management interface.

39 Claims, 10 Drawing Sheets

(56) References Cited

U.S. PATENT DOCUMENTS

2017/0358303 A1* 12/2017 Walker, II ............... G10L 13/02
2018/0121432 A1    5/2018 Parson et al.
2019/0045060 A1*  2/2019 Jandwani ................ G09B 7/00

FOREIGN PATENT DOCUMENTS

| KR | 10-1474856 B1    | 12/2014 |
| KR | 10-2015-0095307 A | 8/2015 |
| KR | 10-2017-0107774 A | 9/2017 |
| KR | 10-2018-0058476 A | 6/2018 |
| KR | 10-2018-0116725 A | 10/2018 |
| KR | 10-2018-0120385 A | 11/2018 |
| WO | WO 03/050668 A2   | 6/2003 |

* cited by examiner

DIALOGUE MANAGEMENT METHOD BASED ON DIALOGUE MANAGEMENT FRAMEWORK AND APPARATUS THEREOF

CROSS-REFERENCE TO RELATED APPLICATIONS

This application claims the benefit under 35 USC § 119(a) of Korean Patent Application No. 10-2019-0094048 filed on Aug. 1, 2019 in the Korean Intellectual Property Office, the entire disclosure of which is incorporated herein by reference for all purposes.

BACKGROUND

Field

The following description relates to a dialogue management method based on a dialogue management framework and apparatus including an interactive interface and natural language understanding (NLU).

Description of Related Art

Chatbot technology for overcoming the limitations to voice or speech recognition is emerging as an interactive interface technology. A chatbot is a compound word of chat and robot, and refers to a computer program configured to perform a dialogue in response to an audio or text input from a user. For example, the chatbot may be used in the field of customer support or commerce, such as for a 24-hour customer service.

NLU is technology for understanding a natural language uttered by a human. NLU may automatically analyze an intent corresponding to a user utterance from an audio or text input.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a dialogue management method, including sequentially resolving an application domain to provide a service to a user, a function related to an intent of the user from among functions of the application domain, and at least one slot to perform the function, based on an interaction with the user comprising an utterance of the user, adaptively determining an expression scheme of a dialogue management interface based on the application domain, the function, and the at least one slot depending on a progress of the resolving of the application domain, and displaying the dialogue management interface based on the expression scheme.

The determining may include determining the expression scheme to display a requested slot not including a value, in response to the progress corresponding to a request for the at least one slot.

The dialogue management method of claim 1, may include displaying interfacing objects indicating a plurality of application domains installed on a terminal of the user, in the dialogue management interface, prior to the resolving of the application domain.

The resolving may include selecting an interfacing object of the interfacing objects through an input manner other than the utterance.

The interfacing objects may be displayed to move in the dialogue management interface and are not fixed.

The interfacing objects may float on the dialogue management interface.

A portion of the interfacing objects may move out of the dialogue management interface and disappear.

New interfacing objects may move into the dialogue management interface from outside of the dialogue management interface.

The dialogue management method of claim 1, may include argumentizing information included in the at least one slot, and calling an application program interface (API) of the function in the application domain based on the argumentized information.

The resolving may include at least one of selecting an application domain corresponding to content of the utterance from among application domains installed on a terminal of the user, and selecting a function corresponding to the content of the utterance from among the functions.

The resolving may include at least one of requesting an application domain to provide the service, in response to a determination of an absence of an application domain corresponding to the utterance from among application domains installed on a terminal of the user, and inquiring about an application domain to provide the service from among candidate application domains, in response to a determination that candidate application domains corresponding to the utterance are installed on a terminal of the user.

The resolving may include waiting for a time period to receive another utterance of the user, in response to a determination of an absence of an application domain corresponding to the utterance from among application domains installed on a terminal of the user.

The resolving may include selection the function based on comparing keywords in the utterance of the user to names of the functions of the application domain.

The resolving may include at least one of requesting a function based on the intent of the user, in response to a determination of an absence of a function corresponding to the utterance from among the functions, or inquiring about a function related to the intent of the user from among candidate functions, in response to a determination that candidate functions corresponding the utterance are present among the functions.

The resolving may include at least one of requesting a first slot, in response to the utterance being insufficient to resolve the first slot among the at least one slot, or inquiring about a second slot from among candidate values, in response the utterance comprising the candidate values corresponding to the second slot from among the at least one slot.

The determining may include at least one of determining the expression scheme to emphasize the application domain from among application domains installed on a terminal of the user, and determining the expression scheme to emphasize the function appropriate for the intent of the user from among the functions.

The displaying may include at least one of displaying interfacing objects indicating the functions of the application domain in the dialogue management interface, in response to the application domain being resolved, or displaying at least one interfacing object indicating the at least one slot in the dialogue management interface, in response to the function being resolved.

The at least one slot may include two or more slots, and the displaying of the at least one slot in the dialogue management interface may include simultaneously displaying the two or more slots.

The at least one slot may include two or more slots, and the displaying of the at least one slot in the dialogue management interface may include sequentially displaying the two or more slots.

The determining may include determining the expression scheme to visualize a hierarchical structure among the application domain, the function, and the at least one slot.

In response to reception of any one or any combination of an input of selecting an interfacing object indicating the application domain, after the application domain is resolved, an input of selecting an interfacing object indicating the function, after the function is resolved, and an input of selecting an interfacing object indicating a slot, after the at least one slot is resolved, the resolving may include rolling back a sequential resolution for any one or any combination of a component indicated by an interfacing object corresponding to the received input, the component corresponding to any one or any combination of the application domain, the function, or the at least one slot, or a component corresponding to a lower level of the component in the hierarchical structure.

The determining may include rolling back the determined expression scheme for any one or any combination of the component indicated by the interfacing object corresponding to the received input, and the component corresponding to the lower level of the component in the hierarchical structure.

The dialogue management method may include storing the argumentized information in a storage space, displaying the argumentized information in an interface indicating the storage space in the dialogue management interface, in response to an input of selecting the storage space, and dragging the argumentized information from the interface indicating the storage space and dropping the argumentized information on the at least one slot, in response to receiving a drag and drop input, wherein the resolving may include resolving the at least one slot to correspond to the argumentized information.

In another general aspect, there is provided a dialogue management apparatus, including a memory in which a program is recorded, and a processor configured to execute the program, wherein the program is configured to perform sequentially resolving an application domain to provide a service to a user, a function related to an intent of the user from among functions of the application domain, and at least one slot to perform the function, based on an interaction with the user comprising an utterance of the user, adaptively determining an expression scheme of a dialogue management interface based on the application domain, the function, and the at least one slot depending on a progress of the resolving of the application domain, and displaying the dialogue management interface based on the expression scheme.

The determining may include determining the expression scheme to display a requested slot not including a value, in response to the progress corresponding to a request for the at least one slot.

The program may be configured to perform displaying interfacing objects indicating a plurality of application domains installed on a terminal of the user, in the dialogue management interface, prior to resolving of the application domain.

The resolving may include selecting an interfacing object of the interfacing objects through an input manner other than the utterance.

The interfacing objects may be displayed to move in the dialogue management interface and are not fixed.

The program may be configured to perform argumentizing information included in the at least one slot, and calling an application program interface (API) of the function in the application domain based on the argumentized information.

The resolving may include at least one of selecting an application domain corresponding to content of the utterance from among application domains installed on a terminal of the user, and selecting a function corresponding to the content of the utterance from among the functions.

The resolving may include at least one of requesting an application domain to provide the service, in response to a determination of an absence of an application domain corresponding to the utterance from among application domains installed on a terminal of the user, and inquiring about an application domain to provide the service from among candidate application domains, in response to a determination that candidate application domains corresponding to the utterance are installed on a terminal of the user.

The resolving may include at least one of requesting a function based on the intent of the user, in response to a determination of an absence of a function corresponding to the utterance from among the functions, or inquiring about a function related to the intent of the user from among candidate functions, in response to a determination that candidate functions corresponding the utterance are present among the functions.

The resolving may include at least one of requesting a first slot, in response to the utterance being insufficient to resolve the first slot among the at least one slot, or inquiring about a second slot from among candidate values, in response the utterance comprising the candidate values corresponding to the second slot from among the at least one slot.

The determining may include at least one of determining the expression scheme to emphasize the application domain from among application domains installed on a terminal of the user, and determining the expression scheme to emphasize the function appropriate for the intent of the user from among the functions.

The displaying may include at least one of displaying interfacing objects indicating the functions of the application domain in the dialogue management interface, in response to the application domain being resolved, or displaying at least one interfacing object indicating the at least one slot in the dialogue management interface, in response to the function being resolved.

The determining may include determining the expression scheme to visualize a hierarchical structure among the application domain, the function, and the at least one slot.

In response to reception of any one or any combination of an input of selecting an interfacing object indicating the application domain, after the application domain is resolved, an input of selecting an interfacing object indicating the function, after the function is resolved, and an input of selecting an interfacing object indicating a slot, after the at least one slot is resolved, the resolving may include rolling back a sequential resolution for any one or any combination of a component indicated by an interfacing object corresponding to the received input, the component corresponding to any one or any combination of the application domain, the function, or the at least one slot, or a component corresponding to a lower level of the component in the hierarchical structure.

The determining may include rolling back the determined expression scheme for any one or any combination of the component indicated by the interfacing object corresponding to the received input, and the component corresponding to the lower level of the component in the hierarchical structure.

The program may be configured to perform storing the argumentized information in a storage space, displaying the argumentized information in an interface indicating the storage space in the dialogue management interface, in response to an input of selecting the storage space, and dragging the argumentized information from the interface indicating the storage space and dropping the argumentized information on the at least one slot, in response to receiving a drag and drop input, wherein the resolving may include resolving the at least one slot to correspond to the argumentized information.

Other features and aspects will be apparent from the following detailed description, the drawings, and the claims.

Figure 1:
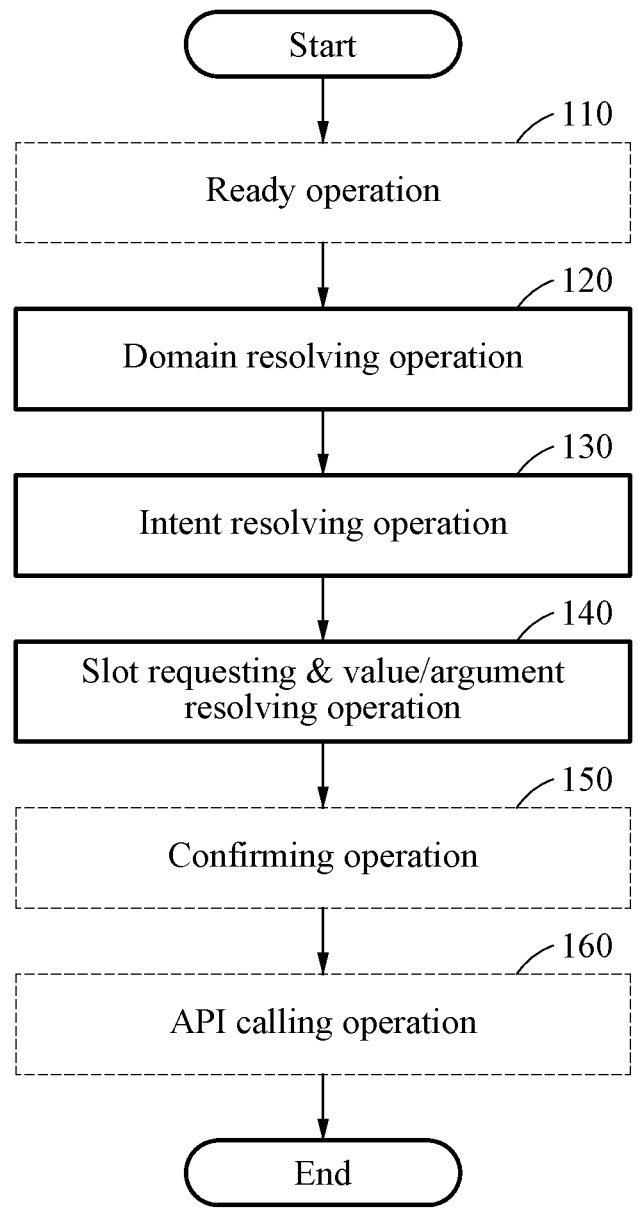
FIG. 1 illustrates an example of a dialogue management method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, except for operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The examples set forth hereinafter may be applied to various devices supporting voice or speech recognition, such as, for example, a smart phone, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, a walking assistance device, a smart speaker, a robot, various Internet of Things (IoT) devices, a smart car, an autonomous vehicle, an automatic or autonomous driving system, an intelligent vehicle, an advanced driver assistance system (ADAS), a head-up display (HUD), and an augmented reality head-up display (AR HUD), and may be performed by an application, middleware, or an operating system installed on a user device, or a program of a server interoperating with the corresponding application.

FIG. 1 illustrates an example of a dialogue management method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, and devices such as a processor, that perform the specified functions, or combinations of special purpose hardware and computer instructions.

Referring to FIG. 1, a dialogue management method includes ready operation 110, domain resolving operation 120, intent resolving operation 130, slot requesting & value/argument resolving operation 140. In an example, the dialogue management method may also include confirming operation 150 and application program interface (API) calling operation 160.

In ready operation 110, a dialogue management framework waits for an input from a user after outputting a default screen. The input from the user includes an utterance of the user and an input by an input manner other than utterance. The input manner other than the utterance includes inputs such as, for example, a click on the screen, a touch on the screen, and tracking of a gaze of the user.

In an example, the utterance of the user is input in the form of an audio through a microphone. In another example, the utterance of the user is received through an input device such as a keyboard or a touchpad. The click on the screen is received through an input device such as a mouse, and the touch on the screen is received through an input device such as a touch screen. The gaze of the user is tracked based on technology that analyzes an image acquired by capturing a user in real time, a contact lens with an embedded mirror or detection coil, and a sensor attached around an eye of the user. In addition, the input from the user further includes an input by a gesture input manner and an input by a motion input manner.

In an example, when the utterance of the user is input in the form of an audio, the dialogue management framework converts the audio into a text. In this example, the dialogue management framework uses a speech-to-text engine to convert the audio into the text. When the utterance of the user is received in the form of a text through an input device such as a keyboard or a touchpad, the dialogue management framework uses the received utterance, without converting it to text.

In ready operation 110, the default screen output from the dialogue management framework displays at least a portion of interfacing objects indicating a plurality of application domains installed on a terminal of the user.

An interfacing object is an information component providing information to the user. The information component provides information to the user through various information providing manners such as a visual information providing manner, an audio information providing manner, a haptic information providing manner, an olfactory information providing manner, and a gustatory information providing manner. In an example, the interfacing object includes at least one of an image and an icon providing visual information to the user.

The interfacing object is an input control receiving a user input. The input control receives a user input through various input manners such as a mouse input manner, a keyboard input manner, a gesture input manner, a motion input manner, and a voice input manner. For example, the interfacing object includes at least one of a button, a checkbox, a radio button, and a toggle switch.

The interfacing object is an element in which the information component and the input control are combined. For example, the interfacing object includes at least one of a selectable image, a selectable list, and a selectable icon.

In operation 120, when a user input with respect to the displayed interfacing objects is received, the dialogue management framework selects an application domain indicated by an interfacing object receiving the user input.

Application domains to be displayed on the default screen are selected based on various criteria from among a plurality of application domains. For example, with respect to all the application domains installed on the terminal, interfacing objects indicating the application domains are displayed on the default screen. In an example, interfacing objects indicating application domains recently installed on the terminal are displayed on the default screen. In an example, interfacing objects indicating recently used domains are displayed on the default screen. In an example, interfacing objects indicating domains separately set by the user are displayed on the default screen. In addition to the above examples, application domains to be displayed on the default screen are selected in various manners.

Ready operation 110 will be described further below with reference to FIG. 2.

In domain resolving operation 120, the dialogue management framework resolves an application domain to provide a service to the user based on an interaction with the user. In intent resolving operation 130 and slot requesting & value/argument resolving operation 140, the dialogue management framework resolves an intent or at least one slot based on the interaction with the user, which will be described later. In an example, the interaction with the user includes an input received by the dialogue management framework from the user and an output transmitted from the dialogue management framework to the user. In an example, the input received by the dialogue management framework from the user includes an utterance of the user, a click with respect to an interfacing object, a touch with respect to a position at which an interfacing object is displayed, and tracking a gaze of the user. The output transmitted from the dialogue management framework to the user includes a request with respect to an application domain, an intent and at least one slot, an inquiry with respect to an application domain, an intent and at least one slot, and a confirmation request with respect to a resolved application domain, a resolved intent and at least one resolved slot.

When there is no application domain corresponding to content of the utterance, when there is no function corresponding to the content of the utterance, or when the utterance does not include content sufficient to resolve a first slot from among at least one slot, the dialogue management framework transmits the request.

When there is a plurality of candidate application domains corresponding to the content of the utterance, when there is a plurality of candidate functions corresponding to the content of the utterance, or when the content of the utterance includes a plurality of candidate values corresponding to a second slot from among the at least one slot, the dialogue management framework transmits the inquiry.

In domain resolving operation 120, the dialogue management framework displays the plurality of interfacing objects indicating the plurality of application domains installed on the terminal of the user in a dialogue management interface. The user selects an application domain to be resolved to be an application domain to provide the service to the user, from among the plurality of interfacing objects indicating the plurality of application domains. The user selects the application domain through at least one of an utterance and at least one of the input manners other than the utterance. In this example, based on the input received from the user, the dialogue management framework resolves the application domain to provide the service to the user. For example, when the input received from the user corresponds to a click or a touch, the dialogue management framework resolves an application domain indicating an interfacing object receiving the click input or the touch input to be the application domain to provide the service to the user.

When the input received from the user corresponds to an utterance of the user, the dialogue management framework selects an application domain corresponding to content of the received utterance as the application domain to provide the service to the user. To select the application domain corresponding to the content of the received utterance, the dialogue management framework compares keywords included in the content of the utterance to names of the application domains. In an example, the dialogue management framework uses a pre-trained machine learning model to select the application domain corresponding to the content of the received utterance. In other examples, the dialogue management framework may use various other methods to select the application domain corresponding to the content of the received utterance without departing from the spirit and scope of the illustrative examples described.

In response to determination there is no application domain corresponding to an input received from the user or there is a plurality of application domains corresponding to the input received from the user, the dialogue management framework requests or inquires about the application domain to provide the service to the user. In an example, in response to determining that there is no application domain corresponding to the received input, the dialogue management framework requests the application domain to provide the service. When there is a plurality of candidate application domains corresponding to the received input, the dialogue management framework inquires about the application domain to provide the service. In an example, when the input received from the user corresponds to an utterance of the user, the input received from the user is highly likely to be misunderstood and misinterpreted when compared to inputs by input manners other than the utterance. Thus, the dialogue management framework requests or inquires about the application domain. In an example, the request or the inquiry is directed to the user.

In response to determination that there is no application domain corresponding to the input received from the user or there is a plurality of application domains corresponding to the input received from the user, the dialogue management framework may wait to receive a new input from the user, rather than immediately transmit a request or an inquiry to resolve the application to provide the service to the user. In an example, when the input received from the user corresponds to a click of the user with respect to an interfacing object or a touch with respect to a position at which an interfacing object is displayed, there is a possibility that the click or the touch is performed accidentally while the user moves the terminal or performs another motion associated with the terminal. Thus, the dialogue management framework may wait to receive a new input from the user. In an example, when a new input is not received from the user within a threshold time, the dialogue management framework requests or inquires about the application domain.

When the application domain to provide the service to the user is resolved, the dialogue management framework displays a plurality of interfacing objects indicating functions of the resolved application domain in the dialogue management interface, which will be described further below with respect to intent resolving operation 130.

Domain resolving operation 120 will be described further below with reference to FIG. 3.

In intent resolving operation 130, the dialogue management framework resolves a function appropriate for an intent of the user from among functions of the application domain to provide the service to the user based on the interaction with the user. The dialogue management framework displays a plurality of interfacing objects indicating functions of the application domain resolved in domain resolving operation 120, in the dialogue management interface. The user performs an input with respect to an interfacing object indicating the function appropriate for the intent of the user. In this example, based on the input received from the user, the dialogue management framework resolves a function appropriate for the intent of the user from among the functions of the resolved application domain. In an example, the dialogue management framework resolves a function indicated by the interfacing object receiving the input to be the function appropriate for the intent of the user.

When the input received from the user corresponds to an utterance of the user, the dialogue management framework selects a function corresponding to content of the received utterance as the function appropriate for the intent of the user. In an example, to select the function corresponding to the content of the received utterance, the dialogue management framework compares keywords included in the content of the utterance to names of the functions of the selected application domain. In an example, the dialogue management framework uses a pre-trained machine learning model to select the function corresponding to the content of the received utterance. In addition, the dialogue management framework may use various related arts to select the function corresponding to the content of the received utterance without departing from the spirit and scope of the illustrative examples described.

When it is determined that there is no function corresponding to an input received from the user or there is a plurality of functions corresponding to the input received from the user, the dialogue management framework requests or inquires about the function appropriate for the intent of the user, similar to when resolving the application domain. When it is determined that there is no function corresponding to the received input, the dialogue management framework requests the function appropriate for the intent of the user. When it is determined that there is a plurality of candidate functions corresponding to the received input, the dialogue management framework inquires about the function appropriate for the intent of the user. In an example, when the input received from the user corresponds to an utterance of the user, the dialogue management framework requests or inquires about the function appropriate for the intent of the user. In an example, the request or the inquiry is directed to the user.

When it is determined that there is no function corresponding to the input received from the user or a plurality of functions exist corresponding to the input received from the user, the dialogue management framework may wait to receive a new input from the user. In an example, when the input received from the user corresponds to a click of the user with respect to an interfacing object or a touch with respect to a position at which an interfacing object is displayed, the dialogue management framework may wait for receiving a new input from the user for a predetermined threshold time.

When the function appropriate for the intent of the user is resolved, the dialogue management framework displays at least one interfacing object indicating at least one slot to perform the resolved function in the dialogue management interface, which will be described further below with respect to slot requesting & value/argument resolving operation 140.

Intent resolving operation 130 will be described further below with reference to FIG. 4.

In slot requesting & value/argument resolving operation 140, the dialogue management framework displays at least one slot to perform the function resolved in intent resolving operation 130, in the dialogue management interface. In this example, the dialogue management framework displays the at least one slot in the dialogue management interface, by displaying at least one interfacing object indicating the at least one slot to perform the resolved function.

In relation to a first slot among the at least one slot, when an utterance includes content sufficient to resolve the first slot, the dialogue management framework resolves the first slot to correspond to at least a portion of the content of the utterance. For example, when the first slot corresponds to a slot associated with "Message text", and the content of the utterance includes content sufficient to determine the message text, the dialogue management framework resolves the first slot to correspond to the message text included in the utterance.

The dialogue management framework resolves the first slot by resolving a value of the first slot. The dialogue management framework resolves the first slot by resolving an argument of the first slot. The argument of the first slot corresponds to data provided as an input of a function to call an application program interface (API).

In an example, the dialogue management framework simultaneously displays the at least one slot to perform the resolved function in the dialogue management interface. In an example, the dialogue management framework sequentially displays the at least one slot to perform the resolved function in the dialogue management interface.

A response to the request or the inquiry transmitted to the user in domain resolving operation 120, intent resolving operation 130 and slot requesting & value/argument resolving operation 140 is received from the user. In this example, the interaction with the user includes the response from the user. When a response to the request or the inquiry transmitted to the user in domain resolving operation 120 is received from the user, the dialogue management framework resolves the application domain to provide the service to the user based on the response received from the user. When a response to the request or the inquiry transmitted to the user in intent resolving operation 130 is received from the user, the dialogue management framework resolves the function appropriate for the intent of the user based on the response received from the user. When a response to the request or the inquiry transmitted to the user in slot requesting & value/argument resolving operation 140 is received from the user, the dialogue management framework resolves the at least one slot based on the response received from the user.

When domain resolving operation 120, intent resolving operation 130 and slot requesting & value/argument resolving operation 140 are performed sequentially, the dialogue management framework adaptively determines an expression scheme of the dialogue management interface based on the application domain to provide the service to the user, the function appropriate for the intent of the user from among the functions of the application domain to provide the service to the user, and the at least one slot to perform the function appropriate for the intent of the user. The dialogue management framework determines the expression scheme to visualize a hierarchical structure from among the application domain, the function appropriate for the intent of the user from among the functions of the application domain, and the at least one slot to perform the function appropriate for the intent of the user. In this example, the dialogue management framework visually represents that the application domain, the function appropriate for the intent of the user from among the functions of the application domain, and the at least one slot to perform the function appropriate for the intent of the user sequentially form the hierarchical structure.

The dialogue management framework determines the expression scheme of the dialogue management interface to visually represent the hierarchical structure. For example, the dialogue management framework determines the expression scheme of the dialogue management interface based on a tree structure in which the application domain is at the top, branches coming out of the application domain indicate the functions of the application domain, and branches coming out of the functions of the application domain indicate the at least one slot.

The dialogue management framework determines the expression scheme of the dialogue management interface to emphasize the application domain to provide the service to the user (the application domain resolved in domain resolving operation 120) and the function appropriate for the intent of the user (the function resolved in intent resolving operation 130). For example, when the application domain to provide the service to the user is resolved in domain resolving operation 120, the dialogue management framework determines the expression scheme of the dialogue management interface to increase the size of the interfacing object indicating the application domain resolved from among the plurality of interfacing objects indicating the plurality of application domains installed on the terminal of the user and to not display interfacing objects indicating the remaining domains from the dialogue management interface.

In an example, the dialogue management framework determines the expression scheme of the dialogue management interface to emphasize in real time a slot associated with the input from the user from among the at least one slot to perform the function appropriate for the intent of the user. For example, when the dialogue management framework needs to receive an input associated with "Message text" from the user to perform a "Message sending" function, a slot associated with "Message text" is emphasized in real time.

When requesting the at least one slot, the dialogue management framework determines the expression scheme of the dialogue management interface to display a requested slot not including a value thereof. For example, when a slot is requested since a value of the slot associated with "Message text" is empty, the slot associated with "Message text" is displayed in the dialogue management interface. Further, depending on a design, the slot to be requested may be displayed to be emphasized in the dialogue management interface.

For ease of description, the operation of determining the expression scheme of the dialogue management interface is described separately from domain resolving operation 120, intent resolving operation 130 and slot requesting & value/argument resolving operation 140. However, the operation of determining the expression scheme of the dialogue management interface is not performed separately from operations 120 through 140. The expression scheme of the dialogue management interface is adaptively determined as operations 120 through 140 are performed sequentially. For example, the dialogue management framework determines the expression scheme of the dialogue management interface step by step based on a progress of operations 120 through 140.

The expression scheme of the dialogue management interface will be described further below with reference to FIGS. 2 through 8.

In confirming operation 150, the dialogue management framework confirms whether the application domain to provide the service to the user is resolved correctly in domain resolving operation 120, whether the function appropriate for the intent of the user is resolved correctly in intent resolving operation 130, and whether the at least one slot to perform the function is resolved correctly in slot requesting & value/argument resolving operation 140. In detail, the dialogue management framework inquires of the user about whether the application domain, the function, and the at least one slot are resolved correctly. The dialogue management framework displays a message inquiring about whether the application domain, the function, and the at least one slot are resolved correctly, in the dialogue management interface.

The dialogue management framework displays the dialogue management interface based on the adaptively determined expression scheme. The dialogue management framework displays the dialogue management interface such that a result of resolving the application domain, the function, and the at least one slot is visually well recognized. The dialogue management framework displays the dialogue management interface after performing domain resolving operation 120, intent resolving operation 130 and slot requesting & value/argument resolving operation 140. The dialogue management framework displays the dialogue management interface after whether the application domain, the function, and the at least one slot are resolved correctly is confirmed by the user in confirming operation 150.

For ease of description, confirming operation 150 is described separately from domain resolving operation 120, intent resolving operation 130 and slot requesting & value/argument resolving operation 140. Tasks of confirming whether the application domain to provide the service to the user is resolved correctly in domain resolving operation 120, whether the function appropriate for the intent of the user is resolved correctly in intent resolving operation 130, and whether the at least one slot to perform the function is resolved correctly in slot requesting & value/argument resolving operation 140 are not necessarily performed through separate operations. In an example, the dialogue management framework confirms whether the application domain to provide the service to the user is resolved correctly in domain resolving operation 120, confirms whether the function appropriate for the intent of the user is resolved correctly in intent resolving operation 130, and confirms whether the at least one slot to perform the function is resolved correctly in slot requesting & value/argument resolving operation 140.

Confirming operation 150 will be described further below with reference to FIG. 8.

In API calling operation 160, the dialogue management framework calls an API based on information included in the at least one slot resolved in slot requesting & value/argument resolving operation 140. The dialogue management framework argumentizes the first slot based on the value of the first slot. In an example, the dialogue management framework immediately argumentizes the first slot based on the argument of the first slot.

Based on the argumentized information, the dialogue management framework calls an API of the function resolved in intent resolving operation 130. The API of the function resolved in intent resolving operation 130 is called within the application domain resolved in domain resolving operation 120.

Based on the called API, an operation appropriate for the intent of the user is performed on the terminal of the user. For example, the dialogue management framework resolves the application domain to provide the service to the user to be "message domain", resolves the function appropriate for the intent of the user to be "Message sending", resolves a slot "To" to be "John", and resolves a slot "Message text" to be a photo of noodles. In this example, when the dialogue management framework calls an API of "Message sending" within "message domain", the terminal of the user send the photo of noodles to "John".

When the dialogue management method is performed, commands selectable by the user are effectively displayed on the default screen output by the dialogue management framework. Further, whether information for the dialogue management framework to perform a command is well input as intended by the user is effectively displayed in the dialogue management interface. In addition, information necessary for performing a conversation between the dialogue management framework and the user, and a progress of a task are effectively displayed in the dialogue management interface. Further, input content is easily edited.

An example of editing the input content will be described further below with reference to FIG. 7.

Figure 2:
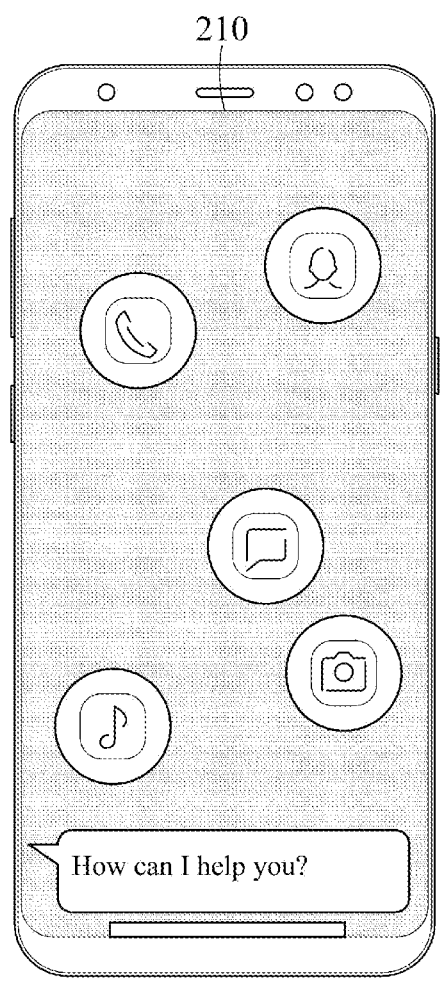
FIG. 2 illustrates an example of a default screen of a dialogue management framework.

FIG. 2 illustrates an example of a default screen of a dialogue management framework.

Referring to FIG. 2, a dialogue management framework outputs a default screen and waits for an input from a user in a situation in which there is no user input (210). The dialogue management framework outputs the default screen displaying at least a portion of interfacing objects indicating a plurality of application domains installed on a terminal of the user. The dialogue management framework intuitively displays application domains installed on the terminal to the user by displaying interfacing objects indicating the application domains on the default screen. When an input with respect to the displayed interfacing objects is received from the user, an application domain to provide a service to the user is resolved.

In an example, the plurality of interfacing objects is displayed to move about in the dialogue management interface, rather than being fixed. For example, the plurality of interfacing objects moves irregularly like floating on the surface of the water. Other types of movement of the plurality of interfacing objects, such as, for example, random movement, movement created by fading patterns, or movement is a fixed grid may be used without departing from the spirit and scope of the illustrative examples described.

In an example, a portion of the plurality of interfacing objects moving in the dialogue management interface may move out of the screen and disappear. Further, new interfacing objects may be displayed as moving into the screen from the outside of the screen. In this example, more interfacing objects are displayed on the default screen when compared to an example in which only predetermined interfacing objects are displayed on the default screen.

The dialogue management framework displays a message supporting the user to perform an input with respect to an interfacing object, in the dialogue management interface. In an example, the dialogue management framework displays a message stating "How can I help you?" in the dialogue management interface, thereby informing the user that the dialogue management framework is ready to receive a user input.

The operations described with reference to FIG. 2 are performed in ready operation 110 of FIG. 1.

Figure 3:
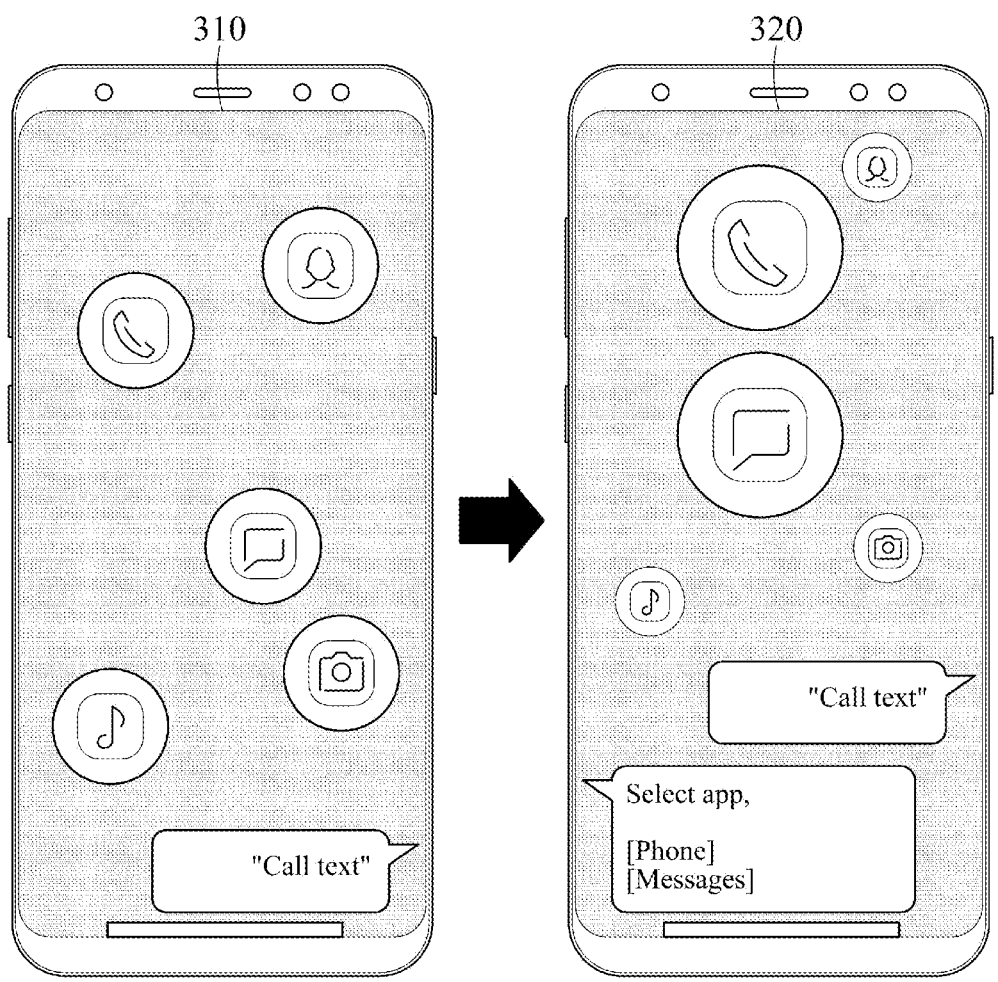
FIG. 3 illustrates an example of resolving an application domain to provide a service to a user in a dialogue management framework.

FIG. 3 illustrates an example of resolving an application domain to provide a service to a user in a dialogue management framework.

Referring to FIG. 3, a dialogue management framework resolves an application domain to provide a service to a user based on an interaction with the user. In detail, the dialogue management framework displays a result of receiving the user input in a dialogue management interface. The dialogue management framework displays a message stating a name of the domain corresponding to the user input, in the dialogue management interface. For example, when the user touches an interface object corresponding to a domain "phone" from among interfacing objects displayed on the default screen, the dialogue management framework displays a message stating "Phone" in the dialogue management interface.

When the input received from the user corresponds to an utterance of the user, the dialogue management framework displays a message outputting content of the utterance in the dialogue management interface. For example, when an utterance stating "Call text" is received from the user, the dialogue management framework displays a message stating "Call text" in the dialogue management interface (310).

The dialogue management framework displays the result of receiving the input from the user in the dialogue management interface. When the application domain to provide the service to the user is resolved based on the user input, the dialogue management framework determines an expression scheme of the dialogue management interface to emphasize the resolved application domain.

The dialogue management framework emphasizes the display of an interfacing object corresponding to the resolved application domain. For example, when the application domain to provide the service to the user is resolved to be "phone", the dialogue management framework displays an interfacing object corresponding to the application domain "phone" to be bigger than the other interfacing objects.

The dialogue management framework displays a message stating a name of the resolved application domain in the dialogue management interface to emphasize the resolved application domain. For example, when the application domain to provide the service to the user is resolved to be "phone", the dialogue management framework displays a message stating "Phone app is selected" in the dialogue management interface.

When it is determined that a plurality of application domains correspond to the input received from the user, the dialogue management framework inquires about the application domain to provide the service to the user. For example, when an utterance stating "Call text" is received from the user, the dialogue management framework displays a message stating "Select app, [Phone] [Messages]" in the dialogue management interface (320).

When it is determined that a plurality of application domains correspond to the input received from the user, the dialogue management framework determines an expression scheme of the dialogue management interface to emphasize the plurality of application domains resolved to correspond to the input received from the user. For example, when the utterance stating "Call text" is received from the user, the dialogue management framework displays interfacing objects corresponding to the application domain "Phone" and the application domain "Messages" to be bigger than the other interfacing objects.

The operations described with reference to FIG. 3 are performed in domain resolving operation 120 of FIG. 1.

Figure 4:
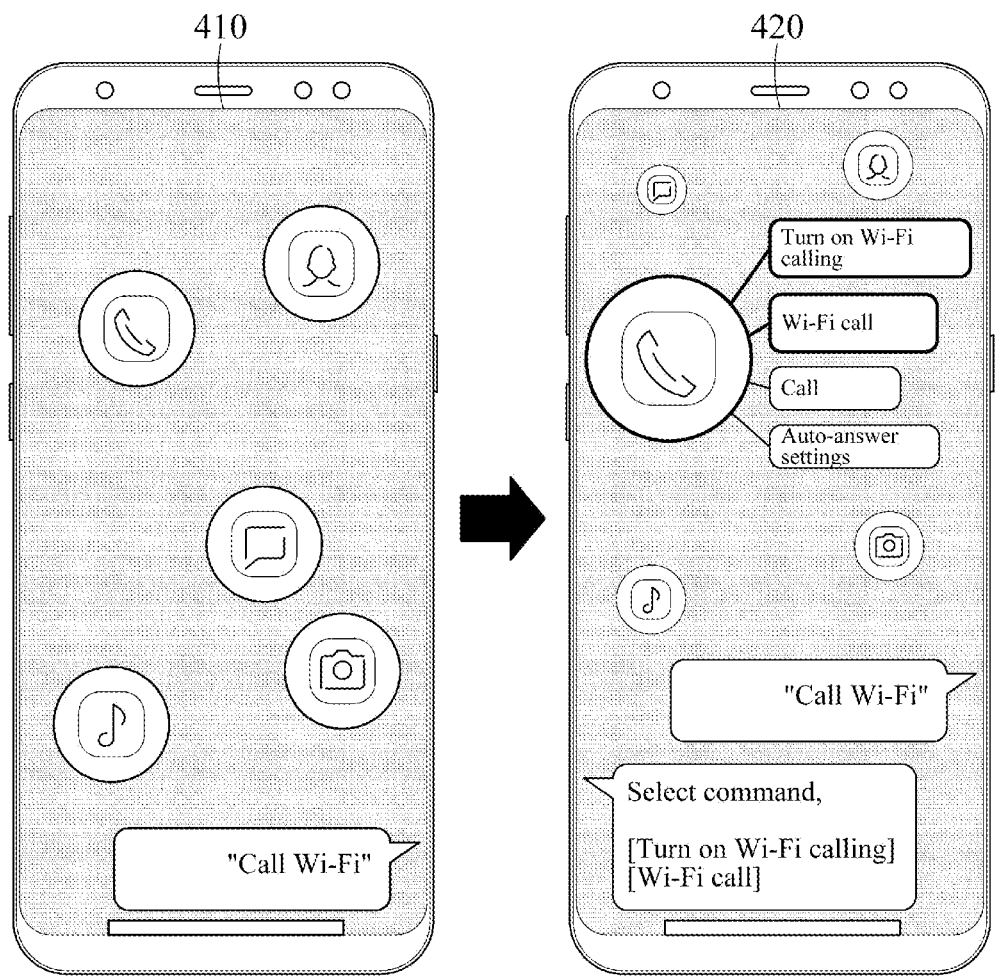
FIG. 4 illustrates an example of resolving a function appropriate for an intent of a user from among functions of a resolved application domain in a dialogue management framework.

FIG. 4 illustrates an example of resolving a function appropriate for an intent of a user from among functions of a resolved application domain in a dialogue management framework.

Referring to FIG. 4, a dialogue management framework resolves a function appropriate for an intent of a user from among functions of an application domain to provide a service to the user based on an interaction with the user. The dialogue management framework displays the functions of the resolved application domain in the dialogue management interface, while displaying the resolved application domain to be emphasized. The functions of the application domain are displayed as interfacing objects, and the interfacing objects indicating the functions of the domain include a picture, a photo, an icon, and a dialogue box.

The dialogue management framework determines an expression scheme of the dialogue management interface to visually represent a hierarchical structure from among the resolved application domain and the functions of the resolved application domain. For example, As shown in dialogue management interface (420), the dialogue management framework determines the expression scheme of the dialogue management interface such that a resolved application domain "Phone" is positioned on the left side, and branches coming out of the application domain indicate functions of the application domain "Phone", for example, "Turn on Wi-Fi calling", "Wi-Fi call", "Call", and "Auto-answer settings".

Similar to when resolving an application domain, the dialogue management framework displays a result of receiving a user input in the dialogue management interface when resolving the function appropriate for the intent of the user. When the user touches an interfacing object corresponding to the function "Turn on Wi-Fi calling", the dialogue management framework displays a message stating "Turn on Wi-Fi calling" in the dialogue management interface. As another example, when an utterance stating "Call Wi-Fi" is received from the user, the dialogue management framework displays a message stating "Call Wi-Fi" in the dialogue management interface (410).

When the function appropriate for the intent of the user is resolved based on the user input, the dialogue management framework determines the expression scheme of the dialogue management interface to emphasize the resolved application domain. The dialogue management interface displays an interfacing object corresponding to the resolved function to be emphasized. For example, when the function appropriate for the intent of the user is resolved to be "Turn on Wi-Fi calling", an interfacing object corresponding to "Turn on Wi-Fi calling" is displayed to be bigger than interfacing objects corresponding to the other functions. In an example, the dialogue management interface also displays a message indicating a name of the resolved function in the dialogue management interface.

When it is determined that a plurality of functions correspond to the input received from the user, in an example, the dialogue management framework inquires about the function appropriate for the intent of the user. For example, when an utterance stating "Call Wi-Fi" is received from the user, the dialogue management framework displays a message stating "Select command, [Turn on Wi-Fi calling] [Wi-Fi call]" in the dialogue management interface (420).

When it is determined that a plurality of functions correspond to the input received from the user, the dialogue management framework determines the expression scheme of the dialogue management interface to emphasize the functions that are resolved to correspond to the input received from the user. Emphasizing the functions that are resolved to correspond to the input received from the user may be done in a variety of manners. For example, when an utterance stating "Call Wi-Fi" is received from the user, the dialogue management framework displays interfacing objects corresponding to a function "Turn on Wi-Fi calling" and a function "Wi-Fi call" to be bigger than the interfacing objects corresponding to the other functions, and displays the interfacing objects corresponding to the function "Turn on Wi-Fi calling" and the function "Wi-Fi call" to be with thicker borders than the interfacing objects corresponding to the other functions.

The operations described with reference to FIG. 4 are performed in intent resolving operation 130 of FIG. 1.

Figure 5:
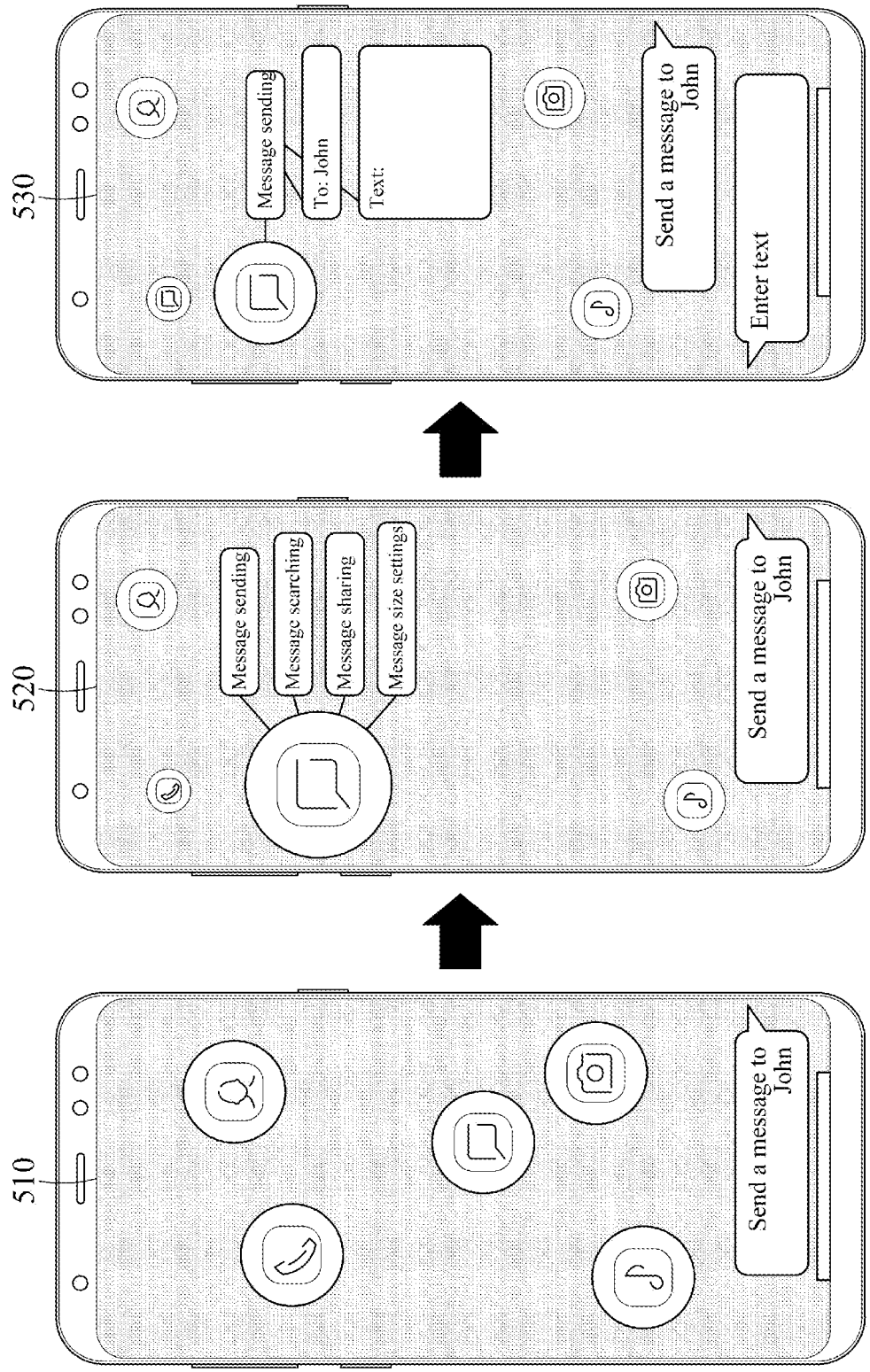
FIG. 5 illustrates an example of resolving at least one slot required to perform a resolved function in a dialogue management framework.

FIG. 5 illustrates an example of resolving at least one slot to perform a resolved function in a dialogue management framework.

Referring to FIG. 5, a dialogue management framework displays at least one slot to perform a function appropriate for an intent of a user in a dialogue management interface. For example, when an utterance stating "Send a message to John" is received from the user (510), the dialogue management framework resolves an application domain to provide a service to the user to be "Messages", resolves a function appropriate for an intent of the user to be "Message sending", among functions of the application domain "Messages" (520), and displays a slot "To" and a slot "Message text" to perform the function "Message sending" in the dialogue management interface (530).

In relation to a first slot among the at least one slot, when an utterance includes content sufficient to resolve the first slot, the dialogue management framework resolves the first slot to correspond to at least a portion of the content of the utterance. For example, since an utterance stating "Send a message to John" includes content "John" to resolve the slot "To", and the content "John" is sufficient to resolve a recipient, the dialogue management framework resolves "To" to be "John".

In another example, when an utterance does not include content sufficient to resolve the first slot, the dialogue management framework requests the first slot. For example, since the utterance stating "Send a message to John" does not include content to resolve the slot "Message text", the dialogue management framework requests the slot "Message text".

When an utterance includes a plurality of candidate values for resolving a second slot among the at least one slot, the dialogue management framework inquires for the second slot among the plurality of candidate values. For example, since an utterance stating "Send a message to John and Tom" includes a plurality of candidate values "John" and "Tom" for resolving the slot "To", the dialogue management framework inquires about the slot "To".

In an example, a request transmitted from the dialogue management framework to the user is displayed in the form of a message in the dialogue management interface. For example, the dialogue management framework displays a message stating "Enter text" in the dialogue management interface to request the slot "Message text".

The operations described with reference to FIG. 5 are performed in slot requesting & value/argument resolving operation 140 of FIG. 1.

Figure 6:
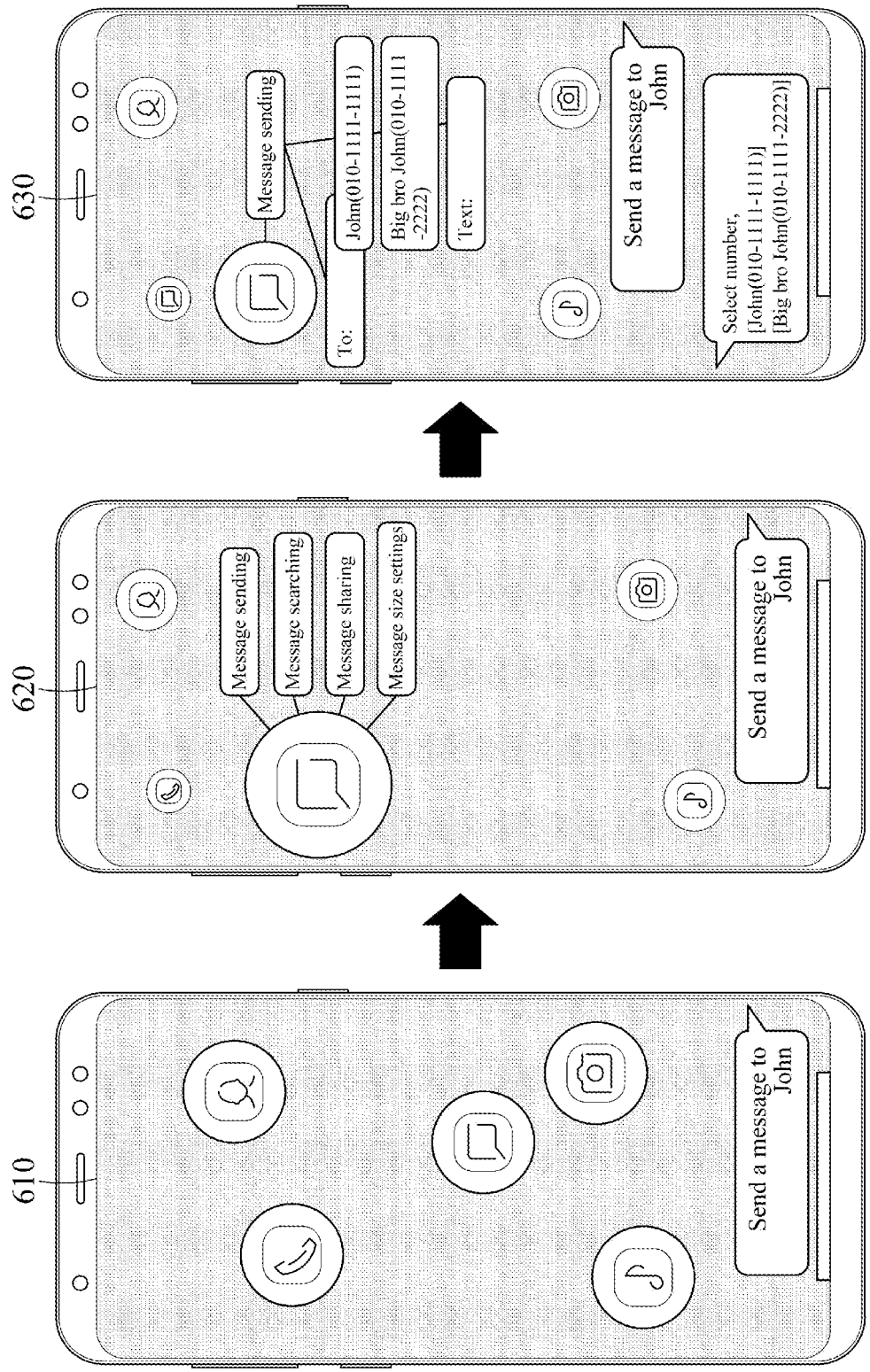
FIG. 6 illustrates an example of requesting at least one slot required to perform a resolved function in a dialogue management framework.

FIG. 6 illustrates an example of requesting at least one slot to perform a resolved function in a dialogue management framework.

Referring to FIG. 6, in relation to a first slot among at least one slot, when an utterance does not include content sufficient to resolve the first slot, for example, when the content of the utterance is unclear to resolve the first slot, a dialogue management framework requests the first slot. For example, when an utterance stating "Send a message to John" is received from a user, the received utterance includes content "John" sufficient to resolve a slot "To". However, if contacts stored in a terminal include "John(010-1111-1111)" and "Big bro John(010-1111-2222)", content of the received utterance is unclear to resolve the slot "To". Thus, the dialogue management framework requests the slot "To". In this example, the dialogue management framework displays a message stating "Select number, [John(010-1111-1111)] [Big bro John(010-1111-2222)]" in the dialogue management interface to resolve the slot "To" (630).

When the content of the utterance is unclear to resolve the first slot, a plurality of candidates to be resolved to be the first slot are displayed in the dialogue management interface. For example, when the utterance stating "Send a message to John" is received, the dialogue management framework additionally displays dialogue boxes to respectively display a candidate "John (010-1111-1111)" and a candidate "Big bro John (010-1111-2222)" at positions adjacent to the slot "To". In this example, a user input with respect to the request includes an utterance, and input manners other than the utterance, for example, a click and a touch with respect to the additionally displayed dialogue boxes (which also applies to a user input with respect to an inquiry). In another example, the user input is a movement of the user's eye to the additionally displayed dialogue box the user desires to select.

Even when the content of the utterance is unclear to resolve the first slot, the dialogue management framework does not request the first slot if the same API is called when any of the candidates to be resolved to be the first slot are selected. For example, when contacts stored in a terminal include "John(010-1111-1111)" and "Big bro John(010-1111-1111)", the message is sent to the same number although the content of the received utterance stating "Send a message to John" is unclear to resolve the slot "To". In this example, the dialogue management framework resolves the first slot by selecting one of the plurality of candidates, rather than requesting the first slot.

Even when the content of the utterance includes a plurality of candidate values corresponding to a second slot among the at least one slot, the dialogue management framework does not inquire about the second slot if the same API is called in response to selection of any candidate value (not shown). For example, when a received utterance stating "Send a message to John and Jane" includes a plurality of candidate values "John" and "Jane" to resolve the slot "To", and contacts stored in the terminal include "John(010-1111-1111)" and "Jane(010-1111-1111)", the message is sent to the same number irrespective of what is resolved to be the slot "To". In this example, the dialogue management framework resolves the second slot by selecting any one candidate value, rather than inquiring about the second slot.

The operations described with reference to FIG. 6 are performed in slot requesting & value/argument resolving operation 140 of FIG. 1.

Figure 7:
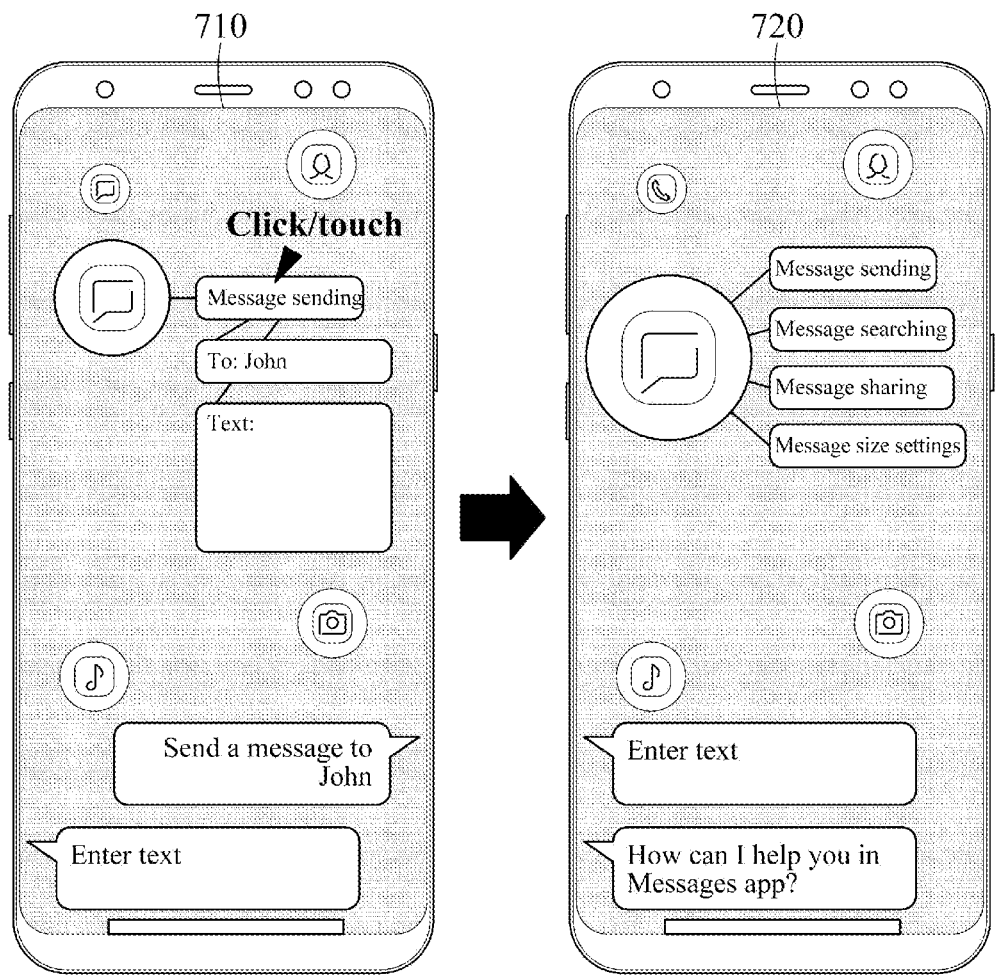
FIG. 7 illustrates an example of rolling back a result of resolving an application domain, a function of the domain, and at least one slot.

FIG. 7 illustrates an example of rolling back a result of resolving an application domain, a function of the domain, and at least one slot.

Referring to FIG. 7, a dialogue management framework receives an input of selecting any one or any combination of an interfacing object indicating a resolved application domain, an interfacing object indicating a resolved function, and an interfacing object indicating at least one resolved slot. In an example, the dialogue management framework rolls back a sequential resolution for at least one of a component indicated by the interfacing object corresponding to the received input and a component corresponding to a lower level of the component indicated by the interfacing object corresponding to the received input. For example, an utterance stating "Send a message to John" is received from a user, an application domain to provide a service to the user is resolved to be "Messages", a function appropriate for an intent of the user is resolved to be "Message sending", and a slot "To" to perform the function is resolved to be "John". In this example, when an input of touching an interfacing object corresponding to the function "Message sending" is received from the user (710), the dialogue management framework rolls back a sequential resolution for at least one slot corresponding to the function and a lower level of the function. In this example, the application domain to provide the service to the user is still "Messages". However, the resolution associated with the function appropriate for the intent of the user and the at least one slot to perform the function is cancelled (720).

When an input with respect to at least one of the interfacing object indicating the resolved application domain, the interfacing object indicating the resolved function, and the interfacing object indicating the at least one resolved slot is received, the dialogue management framework rolls back an expression scheme associated with at least one of the component indicated by the interfacing object corresponding to the received input and the component corresponding to the lower level of the component indicated by the interfacing object corresponding to the received input. In this example, when the component indicated by the interfacing object corresponding to the received input and the component corresponding to the lower level of the component indicated by the interfacing object corresponding to the received input are sequentially resolved, the expression scheme of the dialogue management interface associated therewith is determined again.

Figure 8:
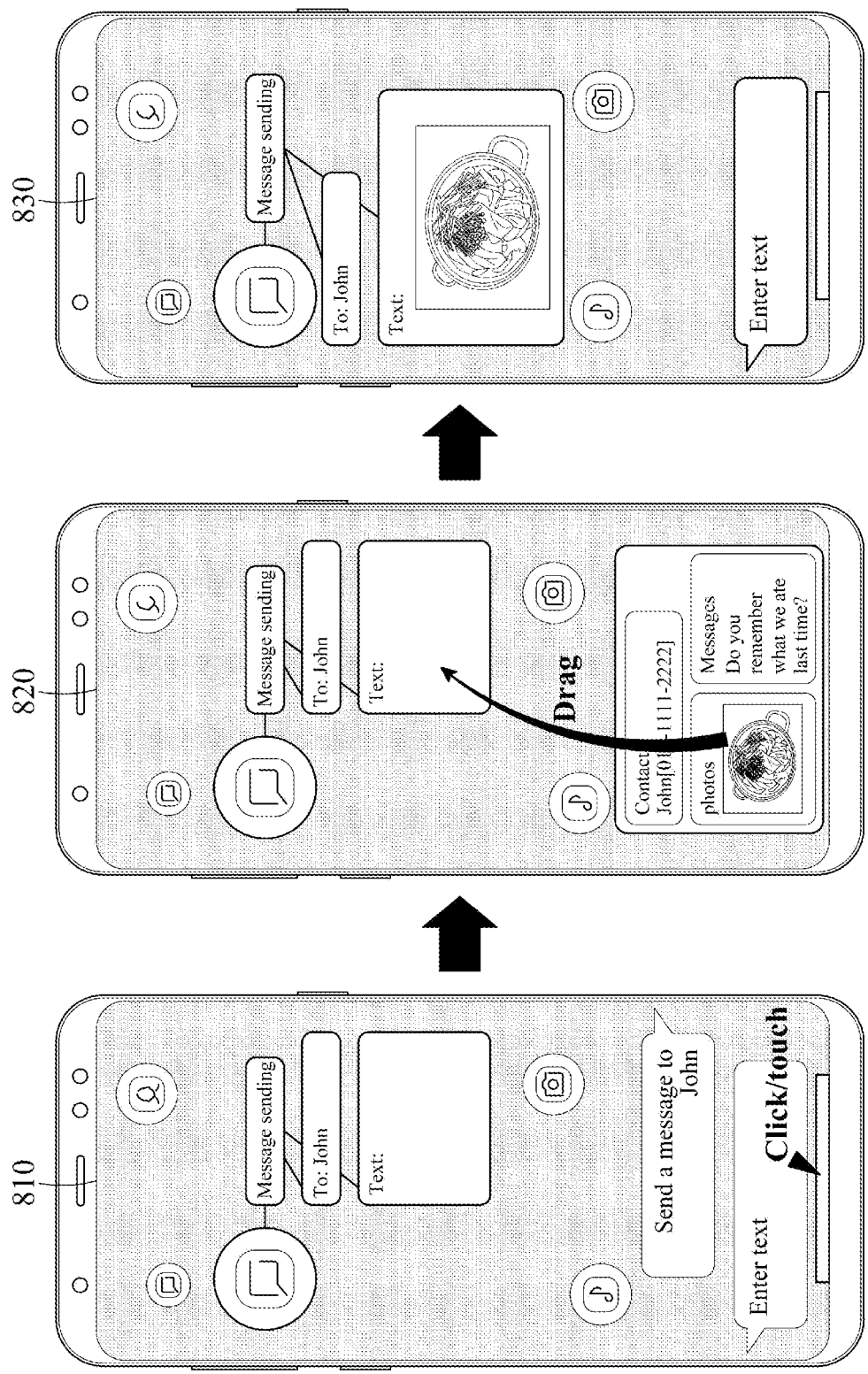
FIG. 8 illustrates an example of resolving at least one slot using information previously argumentized at a user terminal.

FIG. 8 illustrates an example of resolving at least one slot using information previously argumentized at a user terminal.

Referring to FIG. 8, a dialogue management framework stores at least a portion of information argumentized at a user terminal in a storage space. For example, when a message stating "Do you remember what we ate last time?" and a food photo are sent together from the user terminal to "John (010-1111-2222)", the dialogue management framework stores information argumentized in relation to the corresponding operation in the storage space.

When an input of selecting the storage space is received (810), the dialogue management framework outputs the argumentized information stored in the storage space in an interface indicating the storage space in the dialogue management interface (820). The input with respect to the interface indicating the storage space includes a click and a touch of the interface indicating the storage space. For example, when the interface indicating the storage space is positioned at the bottom of the terminal, the dialogue management framework displays at least a portion of information recently argumentized at the terminal, in the interface indicating the storage space when the bottom of the terminal is clicked.

In relation to a result of displaying the argumentized information in the interface indicating the storage space, when an input of dragging and dropping at least a portion of the displayed information on one of the at least one slot, the dialogue management framework resolves a slot to correspond to the dragged and dropped information. For example, when an input of dragging and dropping the food photo in the displayed information on a slot "Text" is received (820), the dialogue management framework resolves the slot "Text" to be the dragged and dropped food photo (830).

Figure 9:
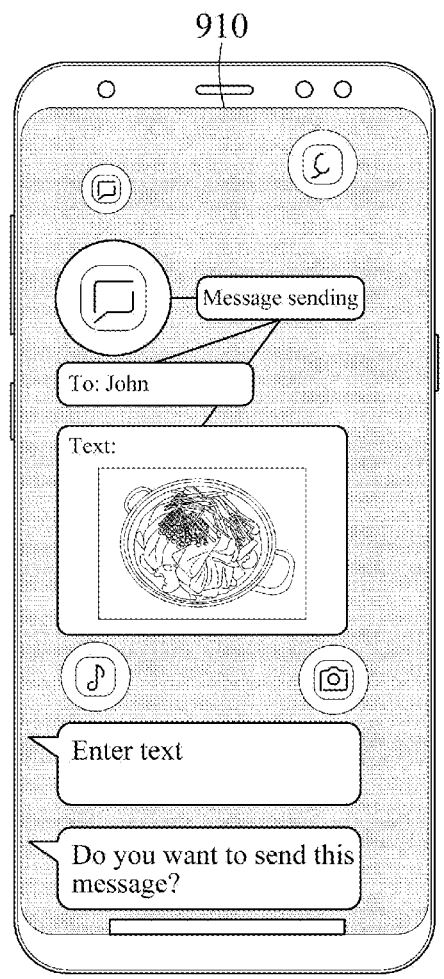
FIG. 9 illustrates an example of transmitting a request for confirming a result of resolving an application domain, a function of the domain, and at least one slot to a user.

FIG. 9 illustrates an example of transmitting a request for confirming a result of resolving an application domain, a function of the domain, and at least one slot to a user.

Referring to FIG. 9, a dialogue management framework inquires of a user about whether an application domain to provide a service to the user is resolved correctly, whether a function appropriate for an intent of the user is resolved correctly, and whether at least one slot to perform the function is resolved correctly.

The dialogue management framework displays a message inquiring about whether the application domain, the function, and the at least one slot are resolved correctly in a dialogue management interface. For example, when the function appropriate for the intent of the user is "Message sending", the dialogue management framework inquires of the user about whether the application domain, the function, and the at least one slot are resolved correctly by displaying a message stating "Do you want to send this message?" in the dialogue management interface (910).

The operations described with reference to FIG. 9 are performed in confirming operation 150 of FIG. 1.

Figure 10:
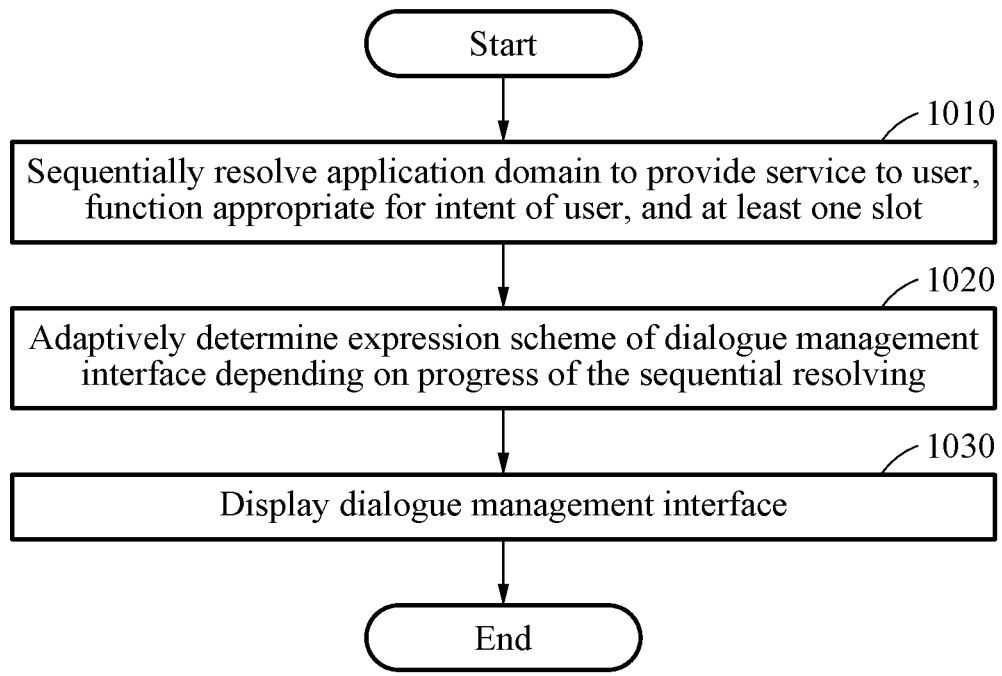
FIG. 10 illustrates an example of a dialogue management method.

FIG. 10 illustrates an example of a dialogue management method. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, and devices such as a processor, that perform the specified functions, or combinations of special purpose hardware and computer instructions. In addition to the description of FIG. 9 below, the descriptions of FIGS. 1-9 is also applicable to FIG. 9 and are incorporated herein by reference. Thus, the above description may not be repeated here.

Referring to FIG. 10, in operation 1010, a dialogue management framework sequentially resolves an application domain to provide a service to a user, a function appropriate for an intent of the user from among functions of the application domain, and at least one slot to perform the function appropriate for the intent of the user, based on an interaction with the user including an utterance of the user. The interaction with the user includes an input received by the dialogue management framework from the user and an output transmitted from the dialogue management framework to the user. The input received by the dialogue management framework from the user includes an utterance of the user, and inputs by input manners other than the utterance. The dialogue management framework inquires about the application domain to provide the service to the user, the function appropriate for the intent of the user, and the at least one slot.

In operation 1020, the dialogue management framework adaptively determines an expression scheme of a dialogue management interface based on the application domain, the function appropriate for the intent of the user, and the at least one slot depending on a progress of the sequentially resolving. The dialogue management framework determines the expression scheme of the dialogue management interface to visualize a hierarchical structure from among the application domain, the function appropriate for the intent of the user, and the at least one slot.

In operation 1030, the dialogue management framework displays the dialogue management interface based on the adaptively determined expression scheme. The dialogue management framework displays the dialogue management interface to visually represent a result of resolving the application domain, the function appropriate for the intent of the user, and the at least one slot.

Figure 11:
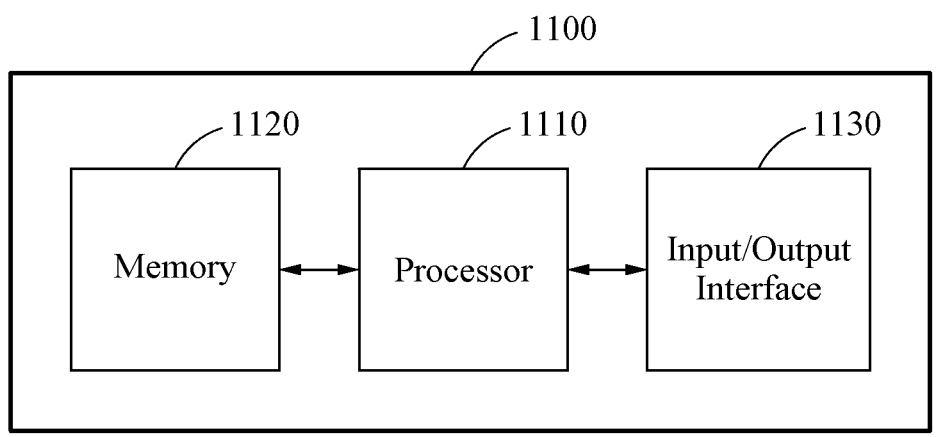
FIG. 11 illustrates an example of a configuration of a dialogue management framework.

FIG. 11 illustrates an example of a configuration of a dialogue management framework.

Referring to FIG. 11, a dialogue management framework 1100 includes a processor 1110, a memory 1120, and an input/output interface 1130.

The processor 1110 includes the at least one apparatus described with reference to FIGS. 1 through 10, or performs the at least one method described with reference to FIGS. 1 through 10. The processor 1110 is a data processing device implemented by hardware including a circuit having a physical structure to perform desired operations. For example, the desired operations include instructions or codes included in a program. For example, the hardware-implemented data processing device includes a microprocessor, a central processing unit (CPU), a processor core, a multi-core processor, a reconfigurable processor, a multicore processor, a multiprocessor, an application-specific integrated circuit (ASIC), and a field programmable gate array (FPGA), a graphics processor unit (GPU), or any other type of multi- or single-processor configuration. Further details regarding the processor 1110 is provided below.

The memory 1120 stores at least a portion of information argumentized at a terminal of a user, or stores a program implementing an operating method of the dialogue management framework 1100. The memory 1120 is a volatile memory or a non-volatile memory. The memory 1120 includes a large capacity storage medium such as a hard disk to store the variety of data. Further details regarding the memory 1120 is provided below The processor 1110 executes the program, and controls the dialogue management framework 1100. Program Codes executed by the processor 1110 are stored in the memory 1120. The dialogue management framework 1100 is connected to an external device (for example, a personal computer or a network) through an input/output device (not shown), and exchanges data therewith. The dialogue management framework 1100 interacts with the user through the input/output interface 1130.

In an example, the dialogue management framework 1100 displays the dialogue management interface to visually represent a result of resolving the application domain, the function appropriate for the intent of the user, and the at least one slot on the input/output interface 1130.

In an example, the input/output interface 1130 may be a display that receives an input from a user or provides an output. In an example, the input/output interface 1130 may function as an input device and receives an input from a user through a traditional input method, for example, a keyboard and a mouse, and a new input method, for example, a touch input, a voice input, and an image input. Thus, the input/output interface 1130 may include, for example, a keyboard, a mouse, a touchscreen, a microphone, and other devices that may detect an input from a user and transmit the detected input to the data processing apparatus 800.

In an example, the input/output interface 1130 may function as an output device, and provide an output of the dialogue management framework 1100 to a user through a visual, auditory, or tactile channel. The input/output interface 1130 may include, for example, a display, a touchscreen, a speaker, a vibration generator, and other devices that may provide an output to a user.

However, the input/output interface 1130 are not limited to the example described above, and any other displays, such as, for example, computer monitor and eye glass display (EGD) that are operatively connected to the dialogue management framework 1100 may be used without departing from the spirit and scope of the illustrative examples described. In an example, the input/output interface 1130 is a physical structure that includes one or more hardware components that provide the ability to render a user interface, render a display, and/or receive user input As described above, when a dialogue management method is performed, it is possible to effectively display commands available to a user on a default screen output from a dialogue management framework. Further, it is possible to effectively display whether information for the dialogue management framework to perform a command is input as desired by the user, in a dialogue management interface. In addition, it is possible to effectively display information for a dialogue between the dialogue management framework and the user, and a progress of a task, in the dialogue management interface. Further, it is possible to easily edit input content.

The dialogue management framework 1100, and other apparatuses, units, modules, devices, and other components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the dialogue management method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A dialogue management method, comprising:
    sequentially resolving an application domain to provide a service to a user, a function related to an intent of the user from among functions of the application domain, and at least one slot to perform the function, based on an interaction with the user comprising an utterance of the user;

adaptively determining an expression scheme of a dialogue management interface based on the application domain, the function, and the at least one slot depending on a progress of the resolving of the application domain; and displaying the dialogue management interface based on the expression scheme, wherein the resolving comprises waiting for a time period to receive another utterance of the user, in response to a determination of an absence of an application domain corresponding to the utterance from among application domains installed on a terminal of the user.

2. The dialogue management method of claim 1, wherein the determining comprises determining the expression scheme to display a requested slot not including a value, in response to the progress corresponding to a request for the at least one slot.

3. The dialogue management method of claim 1, further comprising:

displaying interfacing objects indicating a plurality of application domains installed on a terminal of the user, in the dialogue management interface, prior to the resolving of the application domain.

4. The dialogue management method of claim 3, wherein the resolving comprises selecting an interfacing object of the interfacing objects through an input manner other than the utterance.

5. The dialogue management method of claim 3, wherein the interfacing objects are displayed to move in the dialogue management interface and are not fixed.

6. The dialogue management method of claim 5, wherein a portion of the interfacing objects move out of the dialogue management interface and disappear.

7. The dialogue management method of claim 5, wherein new interfacing objects move into the dialogue management interface from outside of the dialogue management interface.

8. The dialogue management method of claim 3, wherein the interfacing objects float on the dialogue management interface.

9. The dialogue management method of claim 1, further comprising:

argumentizing information included in the at least one slot; and calling an application program interface (API) of the function in the application domain based on the argumentized information.

10. The dialogue management method of claim 9, further comprising:

storing the argumentized information in a storage space;

displaying the argumentized information in an interface indicating the storage space in the dialogue management interface, in response to an input of selecting the storage space; and dragging the argumentized information from the interface indicating the storage space and dropping the argumentized information on the at least one slot, in response to receiving a drag and drop input, wherein the resolving comprises resolving the at least one slot to correspond to the argumentized information.

11. The dialogue management method of claim 1, wherein the resolving comprises at least one of:

selecting an application domain corresponding to content of the utterance from among application domains installed on a terminal of the user; and selecting a function corresponding to the content of the utterance from among the functions.

12. The dialogue management method of claim 1, wherein the resolving comprises at least one of:

requesting an application domain to provide the service, in response to a determination of an absence of an application domain corresponding to the utterance from among application domains installed on a terminal of the user; and inquiring about an application domain to provide the service from among candidate application domains, in response to a determination that candidate application domains corresponding to the utterance are installed on a terminal of the user.

13. The dialogue management method of claim 1, wherein the resolving comprises selecting the function based on comparing keywords in the utterance of the user to names of the functions of the application domain.

14. The dialogue management method of claim 1, wherein the resolving comprises at least one of:

requesting a function based on the intent of the user, in response to a determination of an absence of a function corresponding to the utterance from among the functions; or inquiring about a function related to the intent of the user from among candidate functions, in response to a determination that candidate functions corresponding the utterance are present among the functions.

15. The dialogue management method of claim 1, wherein the resolving comprises at least one of:

requesting a first slot, in response to the utterance being insufficient to resolve the first slot among the at least one slot; or inquiring about a second slot from among candidate values, in response to the utterance comprising the candidate values corresponding to the second slot from among the at least one slot.

16. The dialogue management method of claim 1, wherein the determining comprises at least one of:

determining the expression scheme to emphasize the application domain from among application domains installed on a terminal of the user; and determining the expression scheme to emphasize the function appropriate for the intent of the user from among the functions.

17. The dialogue management method of claim 1, wherein the displaying comprises at least one of:

displaying interfacing objects indicating the functions of the application domain in the dialogue management interface, in response to the application domain being resolved; or displaying at least one interfacing object indicating the at least one slot in the dialogue management interface, in response to the function being resolved.

18. The dialogue management method of claim 1, wherein the at least one slot comprises two or more slots, and the displaying of the at least one slot in the dialogue management interface comprises simultaneously displaying the two or more slots.

19. The dialogue management method of claim 1, wherein the at least one slot comprises two or more slots, and the displaying of the at least one slot in the dialogue management interface comprises sequentially displaying the two or more slots.

20. The dialogue management method of claim 1, wherein the determining comprises determining the expression scheme to visualize a hierarchical structure among the application domain, the function, and the at least one slot.

21. The dialogue management method of claim 20, wherein, in response to reception of any one or any combination of:
an input of selecting an interfacing object indicating the application domain, after the application domain is resolved;
an input of selecting an interfacing object indicating the function, after the function is resolved; and
an input of selecting an interfacing object indicating a slot, after the at least one slot is resolved,
the resolving comprises canceling a sequential resolution for any one or any combination of:
a component indicated by an interfacing object corresponding to the received input, the component corresponding to any one or any combination of the application domain, the function, or the at least one slot; or
a component corresponding to a lower level of the component in the hierarchical structure.

22. The dialogue management method of claim 21, wherein the determining comprises canceling the determined expression scheme for any one or any combination of:
the component indicated by the interfacing object corresponding to the received input; and
the component corresponding to the lower level of the component in the hierarchical structure.

23. A non-transitory computer-readable storage medium storing instructions that, when executed by a processor, cause the processor to perform the dialogue management method of claim 1.

24. A dialogue management apparatus, comprising:
a memory in which a program is recorded; and
a processor configured to execute the program,
wherein the program is configured to perform:
sequentially resolving an application domain to provide a service to a user, a function related to an intent of the user from among functions of the application domain, and at least one slot to perform the function, based on an interaction with the user comprising an utterance of the user;
adaptively determining an expression scheme of a dialogue management interface based on the application domain, the function, and the at least one slot depending on a progress of the resolving of the application domain; and
displaying the dialogue management interface based on the expression scheme,
wherein the resolving comprises waiting for a time period to receive another utterance of the user, in response to a determination of an absence of an application domain corresponding to the utterance from among application domains installed on a terminal of the user.

25. The dialogue management apparatus of claim 24, wherein the determining comprises determining the expression scheme to display a requested slot not including a value, in response to the progress corresponding to a request for the at least one slot.

26. The dialogue management apparatus of claim 24, wherein the program is further configured to perform displaying interfacing objects indicating a plurality of application domains installed on a terminal of the user, in the dialogue management interface, prior to resolving of the application domain.

27. The dialogue management apparatus of claim 26, wherein the resolving comprises selecting an interfacing object of the interfacing objects through an input manner other than the utterance.

28. The dialogue management apparatus of claim 26, wherein the interfacing objects are displayed to move in the dialogue management interface and are not fixed.

29. The dialogue management apparatus of claim 24, wherein the program is further configured to perform:
argumentizing information included in the at least one slot; and
calling an application program interface (API) of the function in the application domain based on the argumentized information.

30. The dialogue management apparatus of claim 29, wherein the program is further configured to perform:
storing the argumentized information in a storage space;
displaying the argumentized information in an interface indicating the storage space in the dialogue management interface, in response to an input of selecting the storage space; and
dragging the argumentized information from the interface indicating the storage space and dropping the argumentized information on the at least one slot, in response to receiving a drag and drop input,
wherein the resolving comprises resolving the at least one slot to correspond to the argumentized information.

31. The dialogue management apparatus of claim 24, wherein the resolving comprises at least one of:
selecting an application domain corresponding to content of the utterance from among application domains installed on a terminal of the user; and
selecting a function corresponding to the content of the utterance from among the functions.

32. The dialogue management apparatus of claim 24, wherein the resolving comprises at least one of:
requesting an application domain to provide the service, in response to a determination of an absence of an application domain corresponding to the utterance from among application domains installed on a terminal of the user; and
inquiring about an application domain to provide the service from among candidate application domains, in response to a determination that candidate application domains corresponding to the utterance are installed on a terminal of the user.

33. The dialogue management apparatus of claim 24, wherein the resolving comprises at least one of:
requesting a function based on the intent of the user, in response to a determination of an absence of a function corresponding to the utterance from among the functions; or
inquiring about a function related to the intent of the user from among candidate functions, in response to a determination that candidate functions corresponding the utterance are present among the functions.

34. The dialogue management apparatus of claim 24, wherein the resolving comprises at least one of:
requesting a first slot, in response to the utterance being insufficient to resolve the first slot among the at least one slot; or
inquiring about a second slot from among candidate values, in response the utterance comprising the candidate values corresponding to the second slot from among the at least one slot.

35. The dialogue management apparatus of claim 24, wherein the determining comprises at least one of:

determining the expression scheme to emphasize the application domain from among application domains installed on a terminal of the user; and determining the expression scheme to emphasize the function appropriate for the intent of the user from among the functions.

36. The dialogue management apparatus of claim 24, wherein the displaying comprises at least one of:

displaying interfacing objects indicating the functions of the application domain in the dialogue management interface, in response to the application domain being resolved; or displaying at least one interfacing object indicating the at least one slot in the dialogue management interface, in response to the function being resolved.

37. The dialogue management apparatus of claim 24, wherein the determining comprises determining the expression scheme to visualize a hierarchical structure among the application domain, the function, and the at least one slot.

38. The dialogue management apparatus of claim 37, wherein, in response to reception of any one or any combination of:

an input of selecting an interfacing object indicating the application domain, after the application domain is resolved;

an input of selecting an interfacing object indicating the function, after the function is resolved; and an input of selecting an interfacing object indicating a slot, after the at least one slot is resolved, the resolving comprises canceling a sequential resolution for any one or any combination of:

a component indicated by an interfacing object corresponding to the received input, the component corresponding to any one or any combination of the application domain, the function, or the at least one slot; or a component corresponding to a lower level of the component in the hierarchical structure.

39. The dialogue management apparatus of claim 38, wherein the determining comprises canceling the determined expression scheme for any one or any combination of:

the component indicated by the interfacing object corresponding to the received input; and the component corresponding to the lower level of the component in the hierarchical structure.

* * * * *